United States Patent Office 3,273,838
Patented Sept. 20, 1966

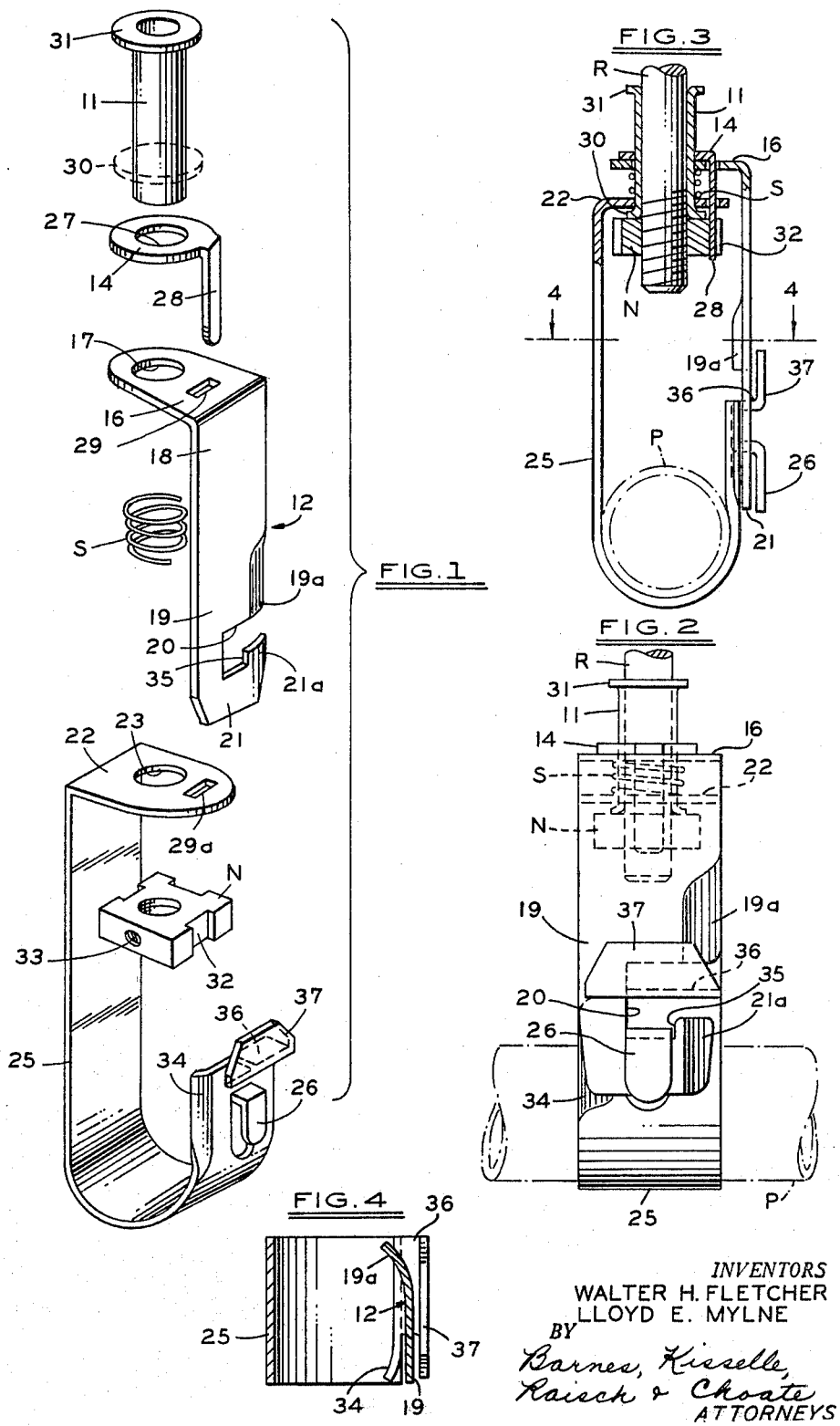

3,273,838
PIPE HANGER
Walter H. Fletcher, Lincoln Park, and Lloyd E. Mylne, Dearborn Heights, Mich.; Carl M. Weideman, administrator of the estate of Walter H. Fletcher, deceased
Filed July 21, 1965, Ser. No. 473,721
24 Claims. (Cl. 248—62)

This application is a continuation-in-part of our co-pending application Ser. No. 394,953, filed Sept. 8, 1964, entitled Pipe Hanger.

This invention relates to pipe hangers for suspending a pipe from the lower end of a rod or the like.

In the construction industry, it is conventional to suspend pipes of various sizes from beams and the like by utilization of pipe hangers which are mounted on the threaded lower end of rods projecting downwardly. Many of such conventional type hangers utilize bolts to hold together the parts of the pipe hangers. Such bolts tend to loosen in use due to vibration and contraction and expansion of the pipe and provide a substantial safety hazard because of falling parts and failure to suspend the pipes in proper position. In addition, such conventional pipe hangers are made of castings or forgings which not only add to the cost but also the weight of the parts.

In our aforementioned patent application, there is disclosed and claimed a pipe hanger which can be readily mounted on the threaded lower end of a rod and can be easily manipulated; which has subsetantially all parts thereof except the nut in an assembly; which can be applied with the pipe in position; which is safe and not subject to loosening due to normal vibration or contraction and expansion of the pipe and which can be readily adjusted within limits without removal.

It is an object of this invention to provide an improved pipe hanger of the aforementioned type.

In the drawing:

FIG. 1 is an exploded perspective view of the parts of a pipe hanger prior to assembly.

FIG. 2 is a side elevational view of the pipe hanger in supporting position.

FIG. 3 is a part sectional and elevational view of the pipe hanger.

FIG. 4 is a sectional view taken along the line 4—4 in FIG. 3.

Referring to the drawing, the pipe hanger embodying the invention is adapted to be mounted on the lower end of the rod R and comprises an assembly 10 consisting of a collet 11, pipe suspending members 12, 13 and a lock member 14 rotatably mounted on the collet 11. The assembly 10 is held on the threaded lower end 15 of the rod R by a nut 16 as presently described.

One pipe supporting member 12 comprises a generally horizontal upper portion 16 having a vertical opening 17 therein through which the collet 11 extends. Pipe supporting member 12 also includes an intermediate portion 18 and a generally vertical portion 19, the lower end of which is formed with a slot 20 that defines a hook 21.

The other pipe supporting member 13 includes a horizontal portion 22 at the upper end having a vertical opening 23 through which the collet 11 extends, an intermediate portion 24 and a generally semicircular lower portion 25 which is adapted to extend around and beneath the pipe P. The free end of the pipe supporting member 13 extends generally upwardly and has a tab 26 struck outwardly therefrom. Tab 26 is adapted to be engaged by the hook 21 of supporting member 12.

Lock member 14 is formed with a circular opening 27 through which the tubular portion of the collet 11 extends. Lock member 14 is also formed with an axially extending finger 28 which is adapted to be moved downwardly through a rectangular opening 29 in the portion 16 of supporting member 12 and a rectangular opening 29 in the portion 22 of supporting member 13. A coil type compression spring S is interposed between the horizontal portion 16 of member 12 and the horizontal portion 22 of member 13 and tends to yieldingly urge the members away from one another to in turn urge hook 21 into engagement with tab 26.

In practice, the lock member 14 and supporting members 12, 13 and spring S are telescoped over the collet 11 and the lower end of the collet 11 is deformed outwardly to form a flange 30, shown in dotted lines in FIG. 1. A corresponding flange 31 has been previously formed on the upper end of the collet 11. By this arrangement, an assembly of the parts of the pipe hanger is provided which facilitates handling of the pipe hanger.

This assembly can be readily telescoped over the lower end of a rod R extending downwardly from a beam or the like and a nut N can be threaded on the lower threaded end 15 of the rod R. The nut N is formed with recesses 32 into one of which the finger 28 is adapted to extend as presently described to lock the nut N in position. In addition, a set screw 33 is provided to further lock the nut in position.

In practice, the assembly is telescoped over the lower end of a rod R and the nut N is threaded on the threaded lower end 15 of the rod R. During this operation, the supporting member 12 is rotated out of position adjacent the tab 26 and preferably into generally overlying relation with the portions 24, 25 of suspending member 13 so that the area adjacent the lower end of the rod R is free for threading of the nut N on the rod. Also during this time, the locking member 14 is moved axially upwardly on the collet 11. After the nut N has been threaded sufficiently to bring the portion 25 of member 13 into snug relationship with the pipe P, suspending member 12 is rotated on collet 11 to bring the hook 21 adjacent tab 26 and to engage the hook 21 with the tab 26. To facilitate the movement of the hook into position, the side edge 34 of the free end of the suspending member 13 adjacent tab 26 is tapered inwaardly. In order to prevent disengagement of the hook 21 from the tab 26 by rotational movement between the members 12, 13, the hook 21 is formed with a recess 35 into which the horizontal portion 36 of tab 26 is adapted to extend. As the suspending member 12 is rotated to bring the hook 21 adjacent tab 26, the pipe is elevated slightly to permit the hook to engage beneath the tab 26. When the hook is engaged beneath the tab 26, the pipe is permitted to return to its original position pulling the suspending member 13 downwardly and thereby locking the hook 21 horizontally by engagement of the horizontal portion 36 in the recess 35 of the hook 21.

In order to prevent inadvertent disengagement of the tab and in order to guide the movement of the hook into position for engagement, the free end of the member 13 having the tab 26 thereon is provided with a horizontal shoulder 36 and an upwardly extending lip 37 which is in the general plane of the vertical portion of the tab 26. As the hook 21 is swung into position, the lip 37 engages the outer surface of the portion 19 of member 12 and the upper edge of slot 20 engages the shoulder 36 to guide the hook 21 into position. In order to facilitate movement of the member 12 into position, the leading edges 19a and 21a are curved inwardly thereby minimizing any tendency of these edges to engage lip 37 and tab 26 and thereby obstruct further rotation of the member 12. After engagement, any tendency for disengagement because of vertical displacement between the members 12, 13 is obstructed by contact between the upper end of the slot 20 with the shoulder 36.

After the hook 21 is engaged with the tab 26, the lock member 14 is moved downwardly to cause the finger to pass through openings 29, 29a into position adjacent one of the recesses 32 in the nut end.

It can thus be seen that there has been provided a pipe hanger which includes a unitary assembly of collet 11, locking member 14 and suspending members 12, 13 whereby the pipe hanger can be readily handled without loss of the parts. The pipe hanger can be readily mounted in position around the pipe, the suspending member 12 being rotated out of the way during initial positioning of the pipe hanger. The mounting of the pipe hanger and the removal can be readily achieved with minimum tools and by unskilled labor. The pipe hanger is applied to the pipe after the pipe is in place and need not be mounted before the pipe is in place. Since the pipe hanger includes a positive locking member 14 and may also include a set screw 33, it will not become loosened due to normal vibration or contraction and expansion of the pipe. The various parts can be made of light weight, mild or tempered steel thus reducing the weight and the cost of the pipe hanger. The weight of the pipe on the suspending member 13 tends to maintain and insure a lock of the pipe hanger. By threading the nut end after moving the locking member 14 upwardly, the elevation of the pipe can be varied with the pipe hanger in position, as may be desired. The collet 11 not only serves as an assembly for the various elements of the pipe hanger but, in addition, serves as a guide for the members 12, 13 and lock member 14.

We claim:

1. In a pipe hanger for suspending a pipe from the threaded lower end of a rod or the like, the combination comprising a tubular collet having enlarged ends and adapted to be telescoped over the threaded lower end of a rod or the like, a first member rotatably mounted on said collet intermediate the enlarged ends of said collet and having a free end adapted to partially encircle a pipe and extending upwardly, a second member rotatably mounted on said collet intermediate the enlarged ends of said collet with the free end thereof projecting downwardly adjacent the free end of said first member, means interlocking the free ends of said first and second members, a nut adapted to be threaded on the threaded lower end of a rod or the like, and a lock member rotatably mounted on said collet intermediate the ends of said collet and having a portion projecting adjacent said nut for preventing rotation of said nut after it has been threaded on a rod or the like, whereby the assembly of said collet, first member, second member and lock member may be mounted on the threaded lower end of a rod or the like by telescoping the collect over the rod and said nut may be threaded on the lower end of a rod to support the pipe from the rod, said first member may be positioned beneath a pipe to partially encircle the pipe, and the second member may be thereafter rotated and interlocked with the first member by said interlocking means, and said lock member may thereafter be moved to engage the nut and prevent its rotation.

2. The combination set forth in claim 1 wherein said means interlocking the ends of said members comprises a hook on one said member, and a projecting tab defining an opening for engagement of the hook in the other said member.

3. The combination set forth in claim 2 wherein said tab is defined by a portion struck out from said other member.

4. The combination set forth in claim 3 wherein the free end of said other said member has a laterally projecting portion which prevents displacement of said hook.

5. The combination set forth in claim 2 wherein said other member has a tapered side edge facilitating the rotational movement of said member having the hook thereon into engagement with said tab.

6. The combination set forth in claim 1 wherein each said member has a tapered side edge facilitating the rotational movement of said member having the hook thereon into engagement with said tab.

7. The combination set forth in claim 1 including a spring interposed between said first and second members.

8. The combination set forth in claim 1 wherein said lock member includes a projecting finger extending downwardly through an opening in at least one of said members adjacent a peripheral surface of said nut, said nut having a portion adapted to be engaged by said finger.

9. In a pipe hanger for suspending a pipe from the threaded lower end of a rod or the like, the assembly comprising a tubular collet having flanges formed at the ends thereof, a first member made of rigid material and having an opening at one end thereof, said collet extending through said opening, a second member having an opening at one end thereof, said collet extending through said opening in said second member, one of said members having a hook formed in the free end thereof, the other of said members having the tab struck outwardly therefrom and adapted to be engaged by said hook when said one member is rotated on said collet, and a lock member having an opening therein telescoped on said collet intermediate the flanges thereof, one of said members having a second opening therein adjacent the first opening therein, said lock member having a finger thereon extending generally axially of said collet and adapted to extend through said second opening, and a nut adapted to be threaded on the threaded lower end of a rod and the like to suspended the collet and the members from a rod.

said nut and finger of said lock portion having interengaging surfaces adapted to engage and prevent rotation of the nut when the finger of the lock member is moved adjacent the nut axially of the collet, whereby the assembly of the collet, first and second member, and the lock member may be mounted on the lower end of a rod by telescoping on the lower end of the rod and the nut may be threaded on the lower end of a rod with one of said members encircling beneath the pipe to be suspended and the other said member may thereafter be rotated on the collet to bring the hook portion thereon beneath the tab on said other said member to hook and interlock the tab, and said locking member may thereafter be moved downwardly to engage said finger with said nut.

10. The combination set forth in claim 9 wherein said hook on said one said member has a recess adapted to engage the tab on the other said member and thereby prevent disengagement of said hook by inadvertent rotational movement of said one member on said collet.

11. The combination set forth in claim 9 wherein said other said member has a lateral extending portion on the free end thereof adapted to engage a surface on the hook portion of the first member and prevent inadvertent disengagement of the hook by movement of said one member axially on said collet.

12. In a pipe hanger for suspending a pipe from the threaded lower end of a rod or the like, the combination comprising a first member adapted to be rotatably mounted on a rod and having a free end adapted to partially encircle a pipe with the free end extending upwardly, a second member adapted to be rotatably mounted on a rod with the free end thereof projecting adjacent the free end of said first member, means interlocking the free ends of said first and second members, a nut adapted to be threaded on a threaded lower end of a rod, and a lock member adapted to be rotatably mounted on a rod and having a portion projecting adjacent said nut for preventing rotation of said nut after it has been threaded on a rod, whereby the first member, a second member and lock member may be mounted on the threaded lower end of a rod, said nut may be threaded on the lower end of a rod to support a pipe from a rod, said first member may be rotated beneath a pipe to partially encircle the pipe, and the second member may be thereafter rotated and interlocked with the first member by said interlocking means.

13. The combination set forth in claim 12 wherein said means interlocking the ends of said members comprises a hook on one said member, and a projecting tab defining an opening for engagement of the hook in another said member.

14. The combination set forth in claim 13 wherein said tab is defined by a portion struck out from said other said member.

15. The combination set forth in claim 14 wherein the free end of said other said member has a laterally projecting portion which prevents displacement of said hook.

16. The combination set forth in claim 13 wherein said other member has a tapered side edge facilitating the rotational movement of said member having the hook thereon into engagement with said tab.

17. The combination set forth in claim 12 wherein each said member has a tapered side edge facilitating the rotational movement of said member having the hook thereon into engagement with said tab.

18. The combination set forth in claim 12 including a spring interposed between said first and second members.

19. The combination set forth in claim 12 wherein said lock member includes a projecting finger extending downwardly through an opening in one of said members adjacent a peripheral surface of said nut, said nut having a flat portion adapted to be engaged by said finger.

20. In a pipe hanger for suspending a pipe from the threaded lower end of a rod or the like, the assembly comprising a tubular collet having flanges formed at the ends thereof, a first member made of rigid material and having an opening at one end thereof, said collect extending through said opening, a second member having an opening at one end thereof, said collet extending through said opening in said second member, one of said members having a hook formed in the free end thereof, the other of said members having the tab struck outwardly therefrom and adapted to be engaged by said hook when said one member is rotated on said collet, and a nut adapted to be threaded on the threaded lower end of a rod and the like to suspend the collet and the member from a rod, whereby the assembly of the collet, first and second member, and the lock member may be mounted on the lower end of a rod by telescoping on the lower end of a rod and the nut may be threaded on the lower end of the rod with one of said members encircling beneath the pipe to be suspended and the other said member may thereafter be rotated on the collet to bring the hook portion thereon beneath the tab on said other said member to hook and interlock the tab.

21. The combination set forth in claim 20 wherein said hook on said one said member has a recess adapted to engage the tab on the other said member and thereby prevent disengagement of said hook by inadvertent rotational movement of said one member on said collet.

22. The combination set forth in claim 20 wherein said other said member has a lateral extending portion on the free end thereof adapted to engage a surface on the hook portion of the first member and prevent inadvertent disengagement of the hook by movement of said one member axially on said collet.

23. In a pipe hanger for suspending a pipe from the threaded lower end of a rod or the like, the assembly comprising a tubular collet having enlarged ends and adapted to be telescoped over the threaded lower end of a rod or the like, a first member rotatably mounted on said collet intermediate the enlarged ends and having a free end, a second member rotatably mounted on said collet intermediate the ends of said collet with the free end thereof projecting adjacent the free end of said first member, means interlocking the free ends of said first and second members, said first and second member when interlocked adapted to encircle a pipe, a nut adapted to be threaded on the threaded lower end of a rod or the like, and a lock member rotatably mounted on said collet intermediate the ends of said collet and having a portion projecting adjacent said nut for preventing rotation of said nut after it has been threaded on a rod or the like, whereby the assembly of said collet, first member, second member and lock member may be mounted on a threaded lower end of a rod or the like by telescoping the collet over a rod, said nut may be threaded on the lower end of the rod to support the pipe from the rod, the free ends of said first member and second member may be interlocked to partially encircle a pipe, and said lock member may be moved to engage the nut and prevent its rotation.

24. The combination set forth in claim 23 wherein said lock member includes a projecting finger extending downwardly through an opening in at least one of said members adjacent a peripheral surface of said nut, said nut having a flat portion adapted to be engaged by said finger.

References Cited by the Examiner

UNITED STATES PATENTS

| | | | |
|---|---|---|---|
| 930,139 | 8/1909 | Borer | 248—60 |
| 1,009,946 | 11/1911 | Vogt | 248—60 |
| 1,582,358 | 4/1926 | Tomkinson | 248—59 |
| 2,267,431 | 12/1941 | Steensen | 248—60 |
| 2,466,247 | 4/1949 | Land | 248—62 |
| 2,605,387 | 7/1952 | Brodie | 248—62 X |
| 2,795,834 | 6/1957 | Szoke | 24—257 |
| 2,996,274 | 8/1961 | Marik et al. | 248—62 |

CLAUDE A. LE ROY, *Primary Examiner.*

UNITED STATES PATENT OFFICE
CERTIFICATE OF CORRECTION

Patent No. 3,273,838                                September 20, 1966

Walter H. Fletcher et al.

It is hereby certified that error appears in the above numbered patent requiring correction and that the said Letters Patent should read as corrected below.

Column 1, line 29, for "subsetantially" read -- substantially --; line 30, after "assembly;" insert -- which can be readily removed; --; column 2, line 41, for "inwaardly" read -- inwardly --; column 5, line 71, for "member" read -- members --.

Signed and sealed this 22nd day of August 1967.

(SEAL)
Attest:

ERNEST W. SWIDER                                EDWARD J. BRENNER
Attesting Officer                                     Commissioner of Patents